Feb. 16, 1965   L. H. MORIN   3,169,299
METHOD OF PRODUCING WEEDLESS FISH HOOKS
Filed May 14, 1963   2 Sheets-Sheet 1
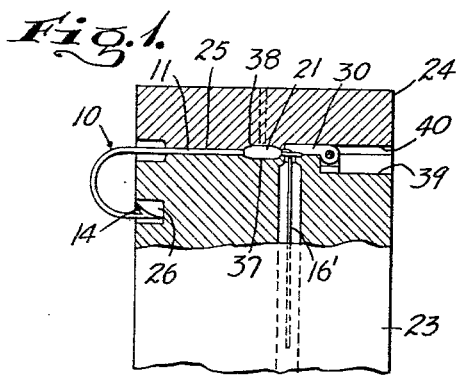
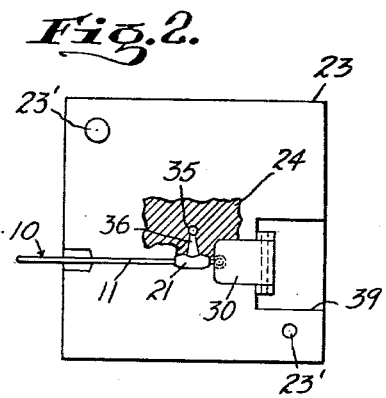
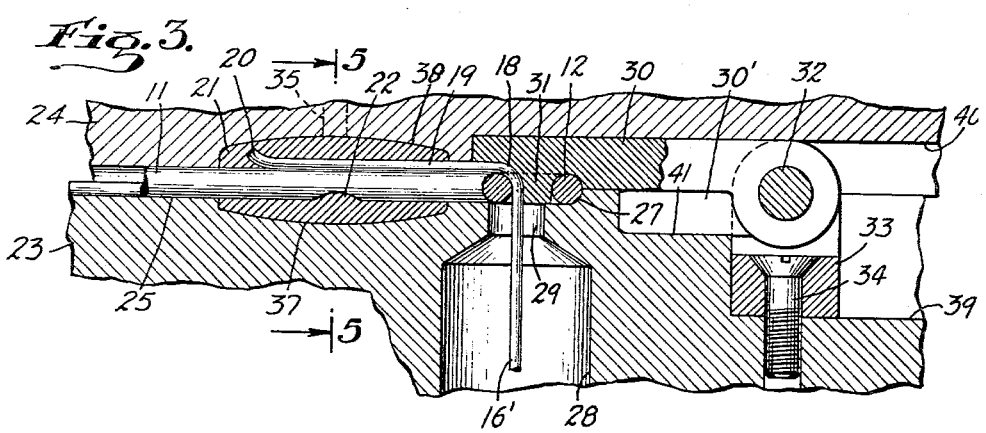
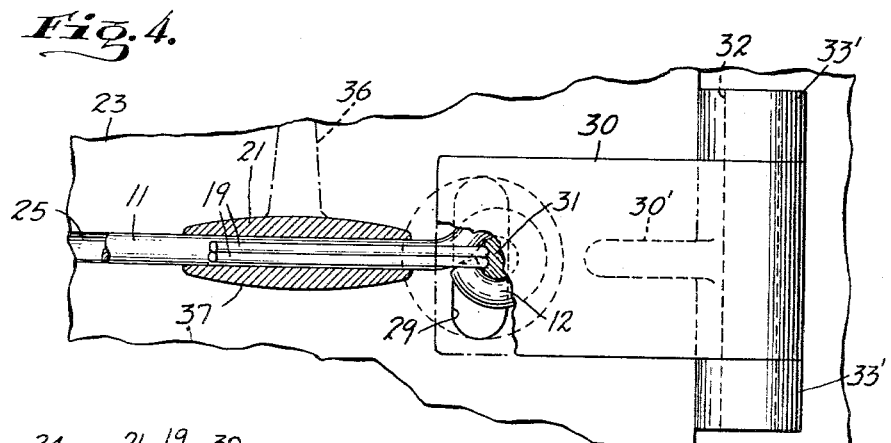
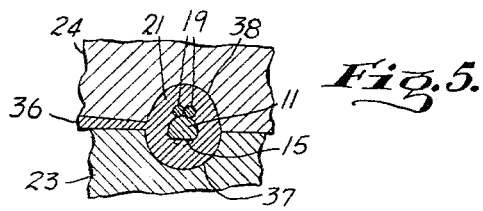
INVENTOR.
LOUIS H. MORIN
BY
Howard T. Thompson
ATTORNEY Feb. 16, 1965  L. H. MORIN  3,169,299
METHOD OF PRODUCING WEEDLESS FISH HOOKS
Filed May 14, 1963  2 Sheets-Sheet 2
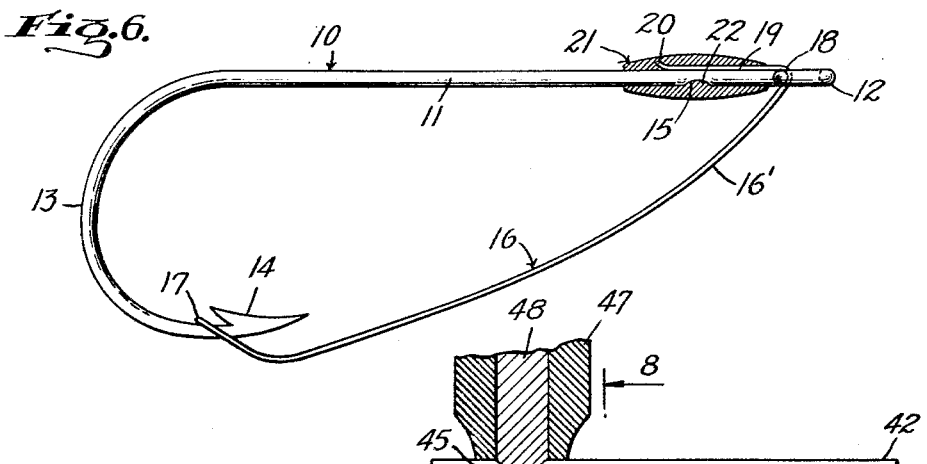
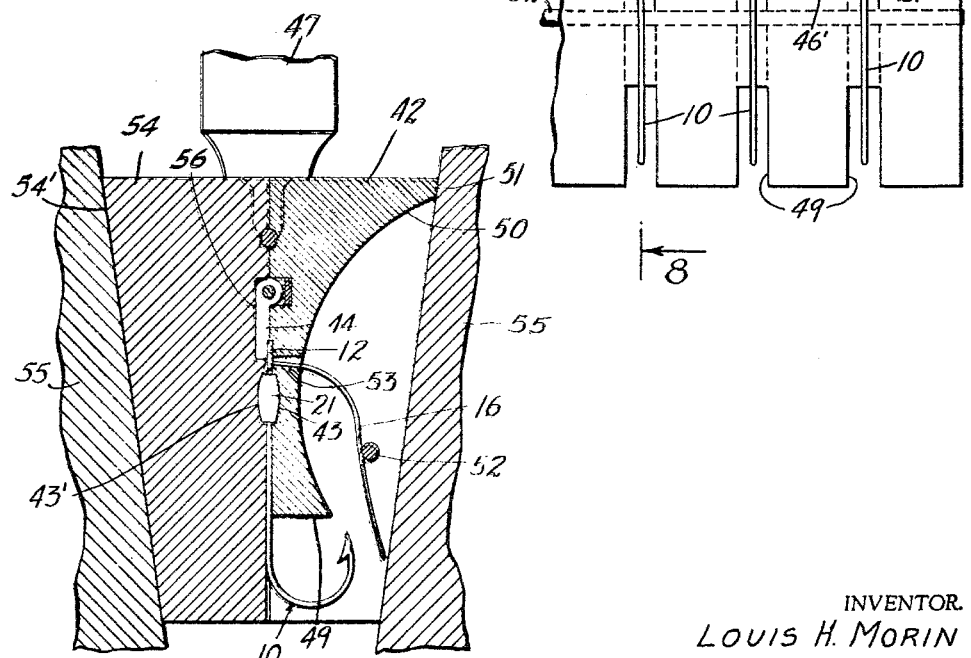
INVENTOR.
LOUIS H. MORIN
BY
*Howard T. Thompson*
ATTORNEY

United States Patent Office 3,169,299
Patented Feb. 16, 1965

3,169,299
METHOD OF PRODUCING WEEDLESS
FISH HOOKS
Louis H. Morin, Bronx, N.Y. (125 Beechwood Ave., New Rochelle, N.Y.), assignor of one-fourth to Madeline F. McGill, Denver, Colo., and one-fourth to J. R. Hanna, Bronxville, N.Y.
Filed May 14, 1963, Ser. No. 280,361
4 Claims. (Cl. 29—9)

This invention relates to what are generally referred to as weedless fishhooks employing a guard element extending between the eye end of a hook and the barbed end thereof. More particularly, the invention deals with a method of attaching guard elements to hooks of this type and kind to insure positive securing and anchorage of the guard element on the hook and in a manner to otherwise leave the hook shank free for normal use of the hook and in preventing the hook from becoming entangled with foreign elements in the water bottom where fishing is being conducted.

Still more particularly, the invention deals with a method, wherein the mounted end of the guard element is supported upon the eye end and adjacent shank of the hook in the operation of forming a securing, bonding, molded body thereon, which can be referred to as an encapsulating shroud.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is a diagrammatic sectional view of a die for use in forming fish hooks of the character defined.

FIG. 2 is a diagrammatic planar view of one of the dies shown in FIG. 1 and illustrating part of the other die in section.

FIG. 3 is an enlarged partial sectional view of the die structure, as seen in FIG. 1, with parts of the construction broken away and in section.

FIG. 4 is a planar view of one of the dies shown in FIG. 3, with parts of the construction broken away and indicating the gate leading to the molded body in dot-dash lines.

FIG. 5 is a section on the line 5—5 of FIG. 3.

FIG. 6 is a side view of a fish hook made according to my invention, illustrating the molded bonding body in section.

FIG. 7 is a diagrammatic plan view of one die illustrating, in part, the method of simultaneously forming bonding bodies on a plurality of fish hooks generally supported in accordance with the teachings in FIGS. 1 to 4, inclusive; and FIG. 8 is a diagrammatic section on the broken line 8—8 of FIG. 7.

My invention deals with the formation of weedless fish hooks, generally of the type and kind shown at 10 in FIG. 6 of the drawing, the fish hook comprising a shank 11, having an eye end portion 12, the other end of the shank having a reversely curved portion 13 terminating at its end in a barb 14. The fish hook, shown in FIG. 6, differs from conventional fish hooks, in that the shank 11, adjacent the eye end 12, has a key recess 15. At 16 is shown a guard element fashioned from a single strand of wire or other material, having a central looped end portion 17 engaging the barbed end portion of the hook and a bent portion 18 formed around part of the eye 12, with parallel ends 19 extending along the shank 11, the ends 19 terminating in offset key portions 20. At 21 is shown the molded or cast securing or bonding body for retaining the ends 19 against displacement from the shank 11, the body including a key portion 22, which extends into the recess 15 in definitely keying the body 21 against displacement on the shank 11. In the showing in FIG. 6, a single end 19 is shown. However, in consideration of FIGS. 4 and 5 of the drawing, the dual ends 19 are clearly illustrated.

In FIGS. 1 to 5, inclusive, I have diagrammatically illustrated one method of producing fish hooks of the type and kind defined and, at this time, it will be understood that, while one means is shown for retaining the body 21 in position and the element 16 against displacement from the body, other means can be employed.

In FIGS. 1 and 2, I have shown at 23 and 24 the two die members, alined by pins 23'. These die members have cavity portions at 25 for collectively receiving the shank 11 of a fish hook, the die 23 having a recess 26 for receiving the barbed end portion 14 of the fish hook.

Considering FIG. 3 of the drawing, it will appear that the die 23 has a cavity portion 27 for receiving the eye end 12 of the hook, the die 23 having a depending chamber 28, with an upper reduced elongated bore portion 29 registering with the eye end 12, through which the shank portion 16' of the element 16 passes. The bend 18 of the element 16 passes around a portion of the eye 12 and the ends 19 extend along the shank 11 of the hook, as clearly noted in FIGS. 3 and 5, and in retaining the element in position, shown in FIG. 3, a hinged flap or retaining member 30 rests upon the eye and 18 and part of 19 and includes a portion 31 extending into the eye and engaging the bends 18 in securely fixing the element 16 in position in the die and on the shank 11. The member 30 is pivoted or hinged, as seen at 32, in a bracket 33 fixed to the die 23, as seen at 34, the bracket 33 having bearing ends 33' supporting the pivot pin 32.

Considering FIG. 2 of the drawing where part of the die 24 is shown in section, it will appear that the sprue or gate 35, through which the material is injected into the die, is offset to one side of the fish hook and the extension or runner 36 of the gate passes horizontally into the cavities 37 and 38 in the dies 23 and 24 forming the molded body 21, previously described. Considering FIG. 2 of the drawing, it will appear that the die 23 has a large recess 39 for swinging movement of the member 30 when the dies are opened and the member 30 also fits in a recess 40 in the die 24 when the dies are in closed position. The member 30 includes an alinement rib portion 30' which seats in a recess 41 in the die 23, the rib portion 31 being shown in elevation in FIG. 3 of the drawing.

From the foregoing, it will be understood that, when the dies are in open position, the fish hook 10 and the element 16 are mounted in the die 23, in the manner clearly shown in FIG. 3 of the drawing, with the member 30 in its open position, after which, the member is moved into the closed position, shown in FIG. 3, and the die 24 is then moved into closed position and the casting or molding shot is performed to fashion the body 21 on the shank 11 and the ends 19 of 16, as diagrammatically shown in FIGS. 3 and 4 of the drawing; whereupon, the die 24 is moved into open position, the member 30 is raised and the fish hook assemblage is removed from the die 23 and, thereafter, the shank portion 16' of the fish hook is fashioned by suitable means to form the curved contour therein, as clearly illustrated in FIG. 6 of the drawing, and by suitable means, the extension or runner 23 will be trimmed from the molded body 21 by trimming means commonly known in the art.

In FIGS. 7 and 8 of the drawing, I have diagrammatically illustrated a method of simultaneously forming a plurality of bodies, such as the body 21, on a plurality of fish hook assemblages. In FIG. 7, I have shown at 42 a plan view of a part of a die having a multiple of cavities 43 therein, in which the shank portions of fish hooks 10 are supported, each fish hook and its guard element being retained in position in the cavities 43 by retaining members 44, similar to the members 30. At 45 is shown a sprue and a runner 46 leading to two adjacent cavities and a runner 46' leading to an end cavity, part of the construction of the die 42 being broken away to indicate that another group of three cavities and fish hooks can be disposed at the left or right side of the die. At 47 is indicated part of a nozzle for injecting the casting or molding material 48 into the sprue and runners in simultaneously forming all of the molded bodies 21 on the shanks of the fish hooks. As the fish hooks diagrammatically illustrated in FIG. 7 are identical with the fish hooks of FIGS. 1 to 6, inclusive, common reference numerals are employed. It will also be apparent that the die 42 has recessed side portions, as at 49, for receiving the curved and barbed ends of the fish hooks.

In this connection, considering FIG. 8 of the drawing, it will appear that the die 42 is wedge-shaped in form and has a recess 50 in the tapered surface 51 opening into the recesses 49 for a definite support of the elements 16 therein in a flexed position by engagement of 16 with a transverse pin 52 in the recess 50. In this flexure of 16, the shank portion adjacent the eye 12 of the hook bears against a surface of a conical passage 53 in the die through which the element 16 passes. It will be understood that, when the companion die 54 is removed with the die 42 from the holders 55 and 54 is separated from 42, the element 16 can be flexibly withdrawn from the cavity 53 in removal of the finished product. The above reference deals with the single cavity portion of the dies, but it will be understood that each of the cavity portions of the dies 42 and 54 will be similarly formed. In this connection, it will also appear, from a consideration of FIG. 8 of the drawing, that the die 54 has recessed portions 56 for reception of the members 44, these members being pivotally supported in 42, generally in the same manner as with the construction shown in FIGS. 3 and 4 of the drawing. It will also be apparent that part of the cavities is also formed in the die 54, as noted at 43' in FIG. 8. The wedge contour of the die 54 is shown by the bevelled surface 54' and, in moving the two dies into the holder 55, adjacent abutting surfaces of the dies are brought into pressure engagement in firmly supporting the fish hook assemblage comprising the hooks 10 and elements 16 in the cavity portions of the dies, preparatory to the injection of the material into the cavities in forming the respective bodies 21.

In the present illustration, the bodies 21 have been shown as formed of a molded or cast metal preferably of lightweight material. However, these molded bodies can be formed of plastic material and the metallic sectioning has been selected in order to simplify the present illustration.

Having fully described my invention, what I claim as new and desire to secure by Letters Patent is:

1. The method of producing weedless fish hooks, the fish hook comprising an elongated shank having a reversely curved end portion terminating in a barb end, the other end portion of the shank terminating in an eye and a weedless guard having an offset end, with the remainder of said guard extending from the eye to said barb end, which consists in supporting the offset end of said guard in intimate contact with said shank and part of the eye, and pressure molding a plastic body about that part of the shank having the major portion of the offset end of the guard in intimate contact therewith in securely bonding said offset end to the shank.

2. A method as defined in claim 1, wherein that part of the shank contained within said plastic body is fashioned to form a key portion engaged by the plastic body in holding the hook and offset end of the guard in intimate contact against relative movement.

3. A method as defined in claim 1, wherein said offset end of the guard is fashioned to form within the plastic body key means retaining said offset end of the guard against withdrawal from said plastic body.

4. A method as defined in claim 1, wherein the guard is fashioned centrally to form a loop engaging the barb end of the fish hook, and the offset end of the guard comprises a pair of parallel strands arranged in intimate contact with the shank of the fish hook.

References Cited by the Examiner
UNITED STATES PATENTS

| 719,704 | 2/03 | Trakel | 43—43.6 |
| 1,114,420 | 10/14 | Williams | 90—59.8 |
| 1,869,293 | 7/32 | Wolford | 43—43.6 |
| 2,789,387 | 4/57 | Plummer | 43—43.6 |

FOREIGN PATENTS

| 794,411 | 2/36 | France. |

RICHARD H. EANES, JR., *Primary Examiner.*